United States Patent [19]

Shu et al.

[11] Patent Number: 4,903,767

[45] Date of Patent: Feb. 27, 1990

[54] SELECTIVE GELATION POLYMER FOR PROFILE CONTROL IN $CO_2$ FLOODING

[75] Inventors: Paul Shu, West Windsor, N.J.; Krishnaswamy Sampath, Carrollton, Tex.

[73] Assignee: Mobil Oil Corporation, New York, N.Y.

[21] Appl. No.: 292,128

[22] Filed: Dec. 30, 1988

[51] Int. Cl.[4] .................... E21B 33/138; E21B 43/22
[52] U.S. Cl. .................... 166/270; 166/273; 166/274; 166/295; 523/130
[58] Field of Search ............... 166/270, 273, 274, 295, 166/294, 300; 523/130

[56] References Cited

U.S. PATENT DOCUMENTS

| | | | |
|---|---|---|---|
| 4,157,322 | 6/1979 | Colegrove | 260/15 |
| 4,513,821 | 4/1985 | Shu | 166/273 |
| 4,565,249 | 1/1986 | Pebdani et al. | 166/303 |
| 4,569,393 | 2/1986 | Bruning et al. | 166/270 |
| 4,673,038 | 6/1987 | Sandiford et al. | 166/270 |
| 4,716,966 | 1/1988 | Shu | 166/295 |
| 4,776,398 | 10/1988 | Chu et al. | 166/295 X |
| 4,787,451 | 11/1988 | Mitchell | 166/270 |
| 4,793,416 | 12/1988 | Mitchell | 166/270 X |

*Primary Examiner*—George A. Suchfield
*Attorney, Agent, or Firm*—Alexander J. McKillop; Charles J. Speciale; Charles A. Malone

[57] ABSTRACT

A process for the selective gelation of a polymer for profile control during carbon dioxide flooding. First, a size selective gel is formed ex-situ. Upon entering a thief zone or a more permeable low pH zone resultant from carbon-dioxide flooding, the gel forms a solid, firm gel. This gel comprises an aqueous composition of a partially and fully alkylated melamine resin and an xanthan polymer. Size selectivity is imparted by the partially alkylated resin and the polymer. Upon contact with the low pH environment, active melamine resin is released from the fully alkylated resin which reacts with the polymer to form a stable, solid gel. Once the solid gel has formed, steam-flooding, water-flooding or a carbon-dioxide oil recovery process is commenced in a zone where a solid gel has not formed.

39 Claims, No Drawings

SELECTIVE GELATION POLYMER FOR PROFILE CONTROL IN CO₂ FLOODING

FIELD OF THE INVENTION

This invention relates to novel gels resultant from an aqueous mixture of a low pH activated resin and a polymer which mixture forms a stable gel in a low pH environment. Resultant gels are thermally stable and useful as profile control agents in a mildly acidic environment.

BACKGROUND OF THE INVENTION

The recovery of hydrocarbons, especially oil, frequently involves the injection of fluids into the reservoir to either force or drive the hydrocarbons from one location to another, as in flooding operations, or even more basically stated, to improve the flow of the hydrocarbons to the production well as in various stimulation operations. Carbon dioxide and other fluids, including water and steam, are frequently injected for such purposes, particularly for the recovery of oil.

In enhanced oil recovery using $CO_2$ flooding, the channeling and gravity override of injected $CO_2$ are common problems. Channeling is due to high permeability zones or "thief" zones which exist in the reservoir or due to the high mobility ratio of $CO_2$ to oil. The override effect is due to the density difference between $CO_2$ and the oil. Early $CO_2$ breakthrough can occur if either of these conditions exists, leading to bypassing of a considerable volume of the oil in the reservoir.

To correct the channeling and the override problems, polymer gels may be used to reduce the permeability or to plug off these areas. The major difficulty of some of the polymer gel processes is the lack of selectivity of the treatment. Placing polymer gels in the wrong areas will not solve the problem and can even damage the reservoir. Mechanical packers are sometimes used to isolate the zones to be treated, but such a process is tedious and expensive.

Therefore, what is needed is a stable gel which can form in situ in a low pH environment and selectively close a carbon dioxide overswept zone where oil is more depleted.

SUMMARY OF THE INVENTION

This invention is directed to a method for selectively forming a gel in a low pH environment. This environment is created during a previously conducted carbon dioxide flood where "break through" has occurred. The resultant pH which is created is from about 3 to about 5. Into this environment, an aqueous gellable composition is injected. Said gellable composition contains a xanthan polymer, a partially alkylated melamine resin, and a fully alkylated melamine resin sufficient to form a shearable and rehealable gel. The partially alkylated resin is used to increase the viscosity of the gellable composition so it will selectively enter a low pH zone of greater permeability.

Upon entering the low pH zone of greater permeability, the fuller alkylated melamine resin is activated by the acidic conditions causing it to react with the xanthan polymer and form a stable solid gel. The gel thus formed closes the more permeable zone to fluid entry. Once closed, an enhanced oil recovery operation can be conducted in a contiguous or adjacent low permeability zone. Upon conducting the enhanced oil recovery operation in said zone, hydrocarbonaceous fluids are recovered therefrom.

Accordingly, it is an objective of this invention to provide for a gel which can selectively enter a low pH zone of greater permeability and thereafter form a stable gel.

It is another object of this invention to selectively close a zone of greater permeability by utilizing the low pH conditions resultant from a previously conducted carbon dioxide flood.

Another object of this invenrtion is to provide for a gel which is stable in a high temperature environment up to about 175° F.

DESCRIPTION OF THE PREFERRED EMBODIMENTS

In the practice of this invention, there is provided a process for retarding the flow of carbon dioxide-containing substances selected from the group consisting of carbon dioxide, gases containing carbon dioxide, carbonic acid, and mixtures thereof, in carbon dioxide break-through fingers in a subterranean formation. The process comprises introducing a gas selected from the group consisting of carbon dioxide and gases containing carbon dioxide into a subterranean deposit containing nonproductive high gas permeable flow channels or carbon dioxide break-through fingers. The gas is introduced for a period of time sufficient for the flow channels to sorb a predetermined amount of the gas. This results in a "sorbed substance" which can form or desorb and produce an acidic substance selected from the group consisting of carbon dioxide, carbonic acid, and mixtures thereof.

By the expression "carbon dioxide break through fingers" or "non-productive high permeable flow channels" as used herein is meant nonproductive reservoir channels having high permeability to the flow of carbon dioxide and/or formation brines. In general, the fingers permit the carbon dioxide to be channeled into nonproductive areas of the reservoir thereby substantially lowering the efficiency of the carbon dioxide injection operation. Such fingers frequently contain substantial amounts of sorbed or absorbed carbon dioxide. These fingers can occur when using a carbon dioxide miscible oil recovery method as discussed in U.S. Pat. No. 4,513,821. This patent is hereby incorporated by reference. When these fingers occur, acidic substances are formed which can react with the gel composition to form a gel.

The expression "sorbed substance" is meant to include all sorbing substances adjacent or proximate to the flow channels. This includes the wall or matrix material forming the boundaries of the flow channels, as well as any material in the flow channel, for example a brine, which is capable of sorbing the gas, i.e. carbon dioxide. The sorbed substance forms or produces the acidic substance either directly or indirectly. It forms directly where a brine absorbs the carbon dioxide which then mixes with the gel-forming composition in the flow channels. It forms indirectly by desorption of the matrix material proximate to the flow channels of the sorbed carbon dioxide containing substance which subsequently absorbs the gel-forming composition in the flow channels. The expression sorbed substance includes all the material proximate to the flow channels which has sorbed carbon dioxide. This material is capable of producing an acidic substance such as carbon dioxide or carbonic acid from the sorbed substances or is an acidic substance itself. These sorbed substances include brine in or on the flow channels which has become acidic by virtue of the carbon dioxide gas. Sorption of carbon dioxide is discussed in U.S. Pat. No. 4,673,038. This patent is hereby incorporated by reference herein.

After the flow channels have sorbed a predetermined amount of the gas, flow of the gas into the subterranean formation is stopped. After stopping the flow of said gas into said subterranean formation, and before the sorbed substance is desorbed, an effective amount of a gel-forming composition is introduced into the subterranean formation. Upon contacting carbon dioxide breakthrough fingers containing the sorbed substance or brine which has absorbed substantial amounts of carbon dioxide, said gel composition forms a gel in said fingers. The solid stable gel which forms retards the flow of said carbon dioxide-containing substance in the fingers.

The gel-forming aqueous composition comprises water, a water soluble low pH stable polymer, and an alkylated water soluble or dispersible melamine resin cross-linker. The term "water" as used herein, unless otherwise specified, includes any source of water, including brine, sea water, brackish water, formation water, fresh water or deionized water. Furthermore, if the water is a brine, the brine can be saturated at an elevated temperature. By the term "aqueous" as used herein, unless otherwise specified, is meant to include aqueous solutions comprising such water. Thus, for example, an aqueous solution of the first substance is to be understood to include the first substance dissolved in brine or fresh water.

Polymers having functional groups such as $NH_2$, $-CONH_2$, $-OH$, $-SH$ can constitute the low pH activated polymer. Polymers which can be used herein include polyvinyl alcohol, polyacrylamide, and polysaccharide polymers such as xanthan gum, guar gums, and locust bean gums. Other polymers which can be used include heteropolysaccharide S-130, poly(acrylamide-co-acrylamido-2-methyl-propanesulfonate), and acrylamide modified polyvinyl alcohol. Also included among the polymers which can be utilized are cellulose and cellulose derivatives such as carboxymethyl cellulose, methyl cellulose, methyl hydroxy propyl cellulose, hydroxy ethyl cellulose, or polysaccharides such as gum tragacanths, alginates and their derivatives. These and other polymers are disclosed in U.S. Pat. No. 4,157,322 which issued to Colegrove. This patent is hereby incorporated by reference herein. The polymer preferred for use herein is a xanthan gum sold by the Pfizer Co. as Flocon ® 4800 biopolymer. The polymer to crosslinker weight ratio is generally between 10:1 to 1:5. Polymer concentration is between 0 to 10 wt.%. Preferably, polymer to crosslinker ratio is between 5:1 to 1:3 and the polymer concentration is between 0.2 to 5 wt.%. The exact composition should be determined by the particular applications based on reservoir conditions (temperature, pressure, permeability, and porosity) and the type of polymer used and its molecular weight.

The alkylated melamine crosslinker utilized herein is hydrolyzed at a pH of from about 3 to about 5 at a temperature of up to about 175° F. Under this pH and temperature, said cross-linker releases active melamine resin. A fully or partially methylated melamine is preferred because of its water solubility, and its lower activation temperature. Ethyl, propyl, isopropyl and butylated melamine resins are preferred for use in reservoirs having temperatures above about 200° F. Due to the latter resin's low solubility, alcohols or surfactants may be added to obtain a homogeneous gelling mixture. A homogeneous mixture is obtained upon the addition of alcohol because it increases the resin's solubility in the water. The addition of a surfactant results in a homogeneous mixture because it uniformly disperses said resin in the water. It can also increase the resin's solubility in water. A fully alkylated melamine resin is represented by the structure shown below.

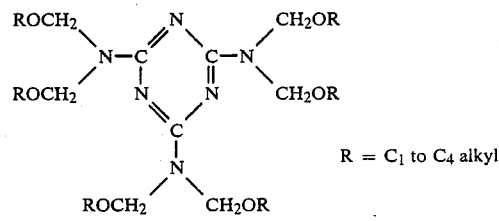

R = $C_1$ to $C_4$ alkyl

The structure below represents a partially alkylated melamine resin:

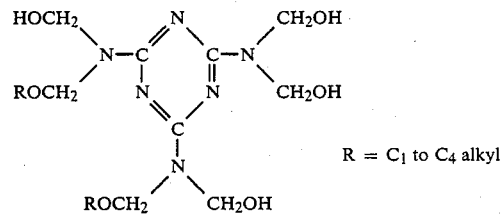

R = $C_1$ to $C_4$ alkyl

Hexamethylmelamine resin is the preferred alkylated melamine resin for use herein. One source of this resin is obtainable from American Cyanamid and is sold as Cymel ™ 303.

When the partially alkylated resin is combined with the xanthan polymer, it imparts "selectivity" to the aqueous mixture. "Selectivity" is defined herein as the ability of a polymer gel to flow preferentially into high permeability zones while causing little or no damage to lower permeability, oil-rich strata.

In one embodiment of this invention, an aqueous gel mixture containing water, the polymer and said resin is injected into either an injection well or a production well. The reservoir to be treated must have been flooded with a carbon dioxide containing substance so that a low-pH profile is established.

The gel-forming composition is formulated so that it will gel when reaching a predetermined pH value which is achieved in the nonproductive high permeable flow channels but which is not achieved in the more desirable and less permeable flow passages. Concurrent with the gelation at the predetermined pH value is the ability to formulate the gel so that it will also gel within a predetermined period of time. By controlling both the initial pH of the gel-forming mixture and the gel time in the nonproductive flow channels a high degree of selectivity as to which zones in the subterranean formation are to be plugged is possible. For example the gel-forming composition and the amount of carbon dioxide sorbed by the nonproductive flow channels and therefore the amount of acidic substance, i.e. carbonated brine or carbon dioxide, formed or generated by such sorbed substance can be designed so that the gel-forming composition will gel at a predetermined pH value of between about 3 to about 6 and in a period of time from about 15 minutes to about 5 days after the gel-forming composition is in the nonproductive flow channels. Preferably the predetermined pH value is from about 3.5 to about 5 and the gelation occurs from about 1 hour to about 4 days after the gel-forming composition enters the flow channels. Especially preferable parameters are where the predetermined pH value is from about 4.5 to 5 and gelation occurs in a period of time from about 2 hours to about 3 days. In yet another preferred embodiments the predetermined pH values for the onset of gelation are from about 3.5 to about 4.5. Gel-forming compositions which have a pH higher than the predetermined pH value for the particular formulation will either not gel or if they do gel will not gel within the period of time required. By having the sorbed substance or brine containing the sorbed carbon dioxide proximate to, and in an effective amount at the nonproductive flow channels, the gel-forming composition will be able to penetrate the subterranean formation in depth and thereafter be acidified to the predetermined pH value by the acidic substance formed from the sorbed substance proximate to the nonproductive flow channels. Whereas the productive or desirable flow passages being less permeable are not able to produce enough acidic substance to form a gel. If they are capable of forming a gel, the gel will not form within the required period of time. After the gel is formed in the nonproductive flow channels during the shut in period of about 15 minutes to about 5 days, the subterranean formation is flooded or swept with a medium, preferably water, to remove or dilute any gel-forming composition remaining in the formation. Removal of ungelled material keeps the desirable flow passages upon which maintains their permeability. U.S. Pat. No. 4,673,038 issued to Sandiford et al. contains a further discussion of pH and gel-forming times. This patent is hereby incorporated by reference herein in its entirety.

An embodiment of the aqueous composition of the low-pH activated gelation process is demonstrated by the following test data. The aqueous composition contained Cymel 303 hexamethylmelamine resin and Flocon 4800 biopolymer. Acetic anhydride ($Ac_2O$) was added to simulate a latent acid. Acid was generated upon contact with water upon the application of heat to lower the pH of the mixture to simulate a pH expected to be encountered during a carbon dioxide flood. The pH of liquid carbon dioxide in water is about 3.5 while the pH of a carbon dioxide flooded carbonate reservoir is about 4 to about 5.

| Sample No. | Gelling Mixture, ppm | | | Temp °F. | Gel Time hr. | pH | Brine Conc. % |
| --- | --- | --- | --- | --- | --- | --- | --- |
| | Flocon 4800 | Cymel 303 | $Ac_2O$ | | | | |
| 1. | 5000 | 5000 | 250 | 175 | 3 | 4.67 | 12 |
| 2. | 5000 | 5000 | 100 | 175 | 3 | 5.39 | 12 |
| 3. | 5000 | 5000 | 50 | 175 | No gel at 4 months | 6.27 | 12 |
| 4. | 3500 | 4000 | 250 | 175· | | | 20 |
| 5. | 3500 | 4000 | 250 | 195 | | | 20 |

When the mixture's pH was higher than 5.39 (sample No. 3), no gel was formed. At a pH of 6.27 in No. 4, no gel was formed after 4 months at 175° F. Samples 1 and 2 were gelled in several hours at a pH of 5.39 and lower. These gels were stable at 175° F. for at least 8 months. Samples 4 and 5 demonstrated that lower concentrations of Flocon and Cymel also form stable gels under a mildly acidic environment.

In general, the gel-forming composition is formulated so that it will not gel unless it is in contact with an acidic brine such as that occuring at carbon dioxide breakthrough points in the subterranean formation. In a further embodiment the gel-forming composition will not gel except in channels containing a sorbed substance or brine having a pH below about 6. Preferably, the gel forming composition is formulated so that it will not gel in brines having a pH of about 5 or higher. These gel formations, therefore, are designed so that they will not gel in flow channels containing brines of higher acidic pH's or basic pH's.

This embodiment is therefore useful in carbon dioxide floods, or cyclic carbon dioxide injection, in which the efficiency has been reduced due to fingering of carbon dioxide through the reservoir. By forming a gel in the carbon dioxide break-through fingers, the efficiency of the operation is greatly improved. A cyclic cargon dioxide steam stimulation method which can be used is described in U.S. Pat. No. 4,565,249 which issued to Pebdani et al. This patent is hereby incorporated by reference in its entirety. A carbon dioxide minimum miscibility pressure oil recovery process which can be used herein is described in U.S. Pat. No. 4,513,821 which issued to Shu and is incorporated by reference herein.

This process will also apply to producing wells that are being used for carbon dioxide injection or production purposes. After ceasation of carbon dioxide flooding, the gel compositions mentioned herein can be injected into a production well to close off fingers or thief zones near the production well. By first blocking those channels or fingers which cause a serious loss of carbon dioxide into the nonproducing strata, the efficiency of recovering oil through carbon dioxide absorption can be greatly increased.

The partially alkylated melamine resin is used in small amounts depending upon the pore size of the formation. As is preferred, this amount should be from about 5.0 to about 50.0 wt.%. The partially alkylated melamine resin is used to impart a higher viscosity to the gel. Since the viscosity is higher, it will selectively enter the more permeable zone. Once the gel composition enters the more permeable zone having the low pH, the fully alkylated melamine resin contained in the gel composition is activated so as to form a solid gel in the more permeable zone. Depending upon the formation lithology, in some embodiments the partially alkylated resin can be omitted from the gel forming composition entirely.

Due to their stability at elevated temperatures, the above described gels can also be formed and used in formations having an average formation or in-situ temperature of about 175° F. or higher. The above described methods of forming a gel in situ in subterranean formations can be practiced using the gels provided by this invention.

The principles of this invention can also be used where the subterranean carbon dioxide-conveying and/or carbonic acid-conveying zone is under the subterranean hydrocarbon-producing formation; or where the subterranean carbon dioxide/carbonic acid-conveying zone surrounds the subterranean hydrocarbon-producing formation; or where at least part of the carbon dioxide/carbonic acid-conveying zone coincides with at least part of the subterranean hydrocarbon-producing formation.

In one embodiment of this invention which is directed to carbon dioxide flood operations, it frequently is desirable to treat the carbon dioxide injector wells with a polymer gel-forming solution to control the carbon dioxide flow profile. In this embodiment such treatment prevents nonproductive channeling of carbon dioxide at the injector well and/or controls and/or redirects carbon dioxide flow through regions of varying permeability. Since in this embodiment the polymer is injected as a relatively low viscosity aqueous phase it penetrates preferentially the region of highest permeability. Accordingly, after formation of the gel in high permeability regions, such regions are converted to low permeability to further retard carbon dioxide/carbonic acid flow thereby causing, upon further carbon dioxide injection, a carbon dioxide sweep of previously inaccessible areas in the formation which usually have relatively low permeability. By extending the carbon dioxide flow to such previously inaccessible regions, more hydrocarbons can be recovered than would be recovered in the absence of such polymer treatment.

The gels of this invention have improved resistance to heat and are stable in hard water. These characteristics make these gels particularly useful for many oil field applications. For oil field application, the stability and durability of the gels of this invention are an important advantage.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for closing at least one zone in a subterranean formation where a carbon dioxide flooding process has caused the existence of carbon dioxide break-through fingers comprising:
   (a) introducing a gas selected from a member of the group consisting of carbon dioxide and gases containing carbon dioxide into a subterranean deposit containing carbon dioxide break-through fingers;
   (b) after said carbon dioxide break-through fingers have sorbed a predetermined amount of said gas, stopping the flow of said gas into said subterranean formation;
   (c) after stopping the flow of said gas into said subterranean formation, introducing an effective amount of a gel-forming composition into said subterranean formation and into said carbon dioxide break-through fingers, said gel-forming composition being operable, when contacting carbon dioxide break-through fingers containing an aqueous fluid which has absorbed substantial amounts of carbon dioxide, to form a gel in said fingers which is operable for retarding the flow of said gas through said fingers, said gel-forming composition comprising
      (i) an aqueous solution containing a water soluble xanthan polymer; and
      (ii) a partially and a fully alkylated melamine resin sufficient to cross-link said polymer;
   (d) injecting selectively said gel-forming composition into the break-through fingers of said formation where selectively is imparted by a higher viscosity resultant from said partially alkylated resin; and
   (e) allowing said composition to remain in the formation for a time sufficient for the fully alkylated resin to form an active resin which results in the creation of a stable solid gel which closes said fingers.

2. The method as recited in claim 1 wherein said aqueous fluid comprises fresh water, salt water or brackish water.

3. The method as recited in claim 1 where the polymer to resin ratio is from about 10:1 to about 1:5.

4. The method as recited in claim 1 where the polymer concentration is from about 0.1 to about 5.0 wt.%.

5. The method as recited in claim 1 where the fully alkylated resin, is a compound having the formula:

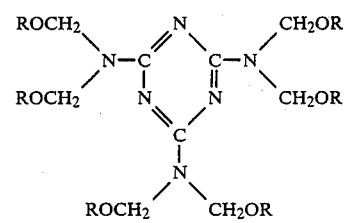

where R is selected from a member of the group consisting of $C_1$ through $C_4$ alkyl.

6. The method as recited in claim 5 where R comprises ethyl, propyl, isopropyl, and butyl alkyl.

7. The method as recited in claim 1 where the partially alkylated resin is a compound having the formula:

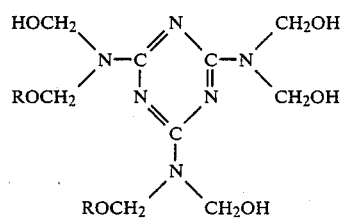

where R is selected from a member of the group consisting of $C_1$ through $C_4$ alkyl.

8. The method as recited in claim 7 where R comprises ethyl, propyl, isopropyl and butyl alkyl.

9. The method as recited in claim 1 where the fully alkylated melamine resinn is hexamethylmelamine resin.

10. The method as recited in claim 1 where a solid, firm gel is formed in a pH environment of from about 3 to about 5.

11. The method as recited in claim 1 where the gel composition remains in the formation from about 0.25 hours to about 5 days before forming a solid, firm gel.

12. The method as recited in claim 1 where the partially and fully alkylated melamine resin comprises ethyl, propyl, isopropyl, and butylated melamine resins which can be used in reservoirs having temperatures above about 200° F.

13. The method as recited in claim 1 where alcohol and a surfactant are added to the gel-forming composition so as to obtain a homogenous gelling mixture.

14. The method as recited in claim 1 where a solid, firm gel is formed in a pH environment of less than about 6.

15. A method for selectively closing carbon dioxide break-through fingers in a subterranean formation comprising:

(a) conducting a carbon dioxide oil recovery process in said formation until carbon dioxide breakthrough occurs during which process carbon dioxide is sorbed into aqueous formation fluids in an amount sufficient to create a substantially low pH environment;

(b) ceasing said carbon dioxide oil recovery process;

(c) introducing thereafter an effective amount of a gel-forming composition into said subterranean formation and into said carbon dioxide breakthrough fingers, said gel-forming composition being operable, when contacting carbon dioxide break-through fingers containing said fluids with a substantially low pH, to form a gel in said fingers which is operable for retarding the flow of carbon dioxide through said fingers, said gel-forming composition comprising (i) an aqueous solution containing a water soluble xanthan polymer, and (ii) a partially and a fully alkylated melamine resin sufficient to cross-link said polymer;

(d) injecting selectively said gel-forming composition into the break-through fingers of said formation where selectively is imparted by a higher viscosity resultant from said partially alkylated resin; and (e) allowing said composition to remain in the formation for a time sufficient for the fully alkylated resin to form an active resin thereby creating a stable solid gel which closes said fingers.

16. The method as recited in claim 15 whhere after step (e) a carbon dioxide flooding or stimulation operation is initiated in said formation to recover additional hydrocarbonaceous fluids.

17. The method as recited in claim 15 where said aqueous fluid comprises fresh water, salt water or brackish water.

18. The method as recited in claim 15 where the polymer to resin ratio is from about 10:1 to about 1:5.

19. The method as recited in claim 15 where the polymer concentration is from about 0.1 to about 5.0 wt.%.

20. The method as recited in claim 12 where the fully alkylated resin, is a compound having the formula:

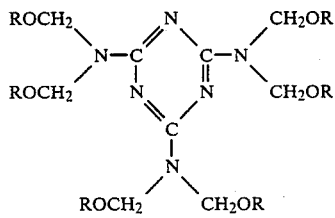

where R is selected from a member of the group consisting of $C_1$ through $C_4$ alkyl.

21. The method as described in claim 20 where R comprises ethyl, propyl, isopropyl, and butyl alkyl.

22. The method as recited in claim 15 where the partially alkylated resin is a compound having the formula:

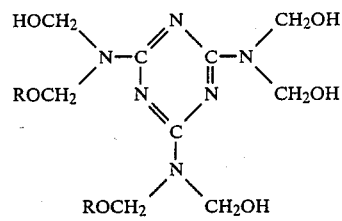

where R is selected from a member of the group consisting of $C_1$ through $C_4$ alkyl.

23. The method as recited in claim 22 where R comprises ethyl, propyl, isopropyl and butyl alkyl.

24. The method as recited in claim 15 where the fully alkylated melamine resin is hexamethylmelamine resin.

25. The method as recited in claim 15 where a solid, firm gel is formed in a pH environment of from about 3 to about 5.

26. The method as recited in claim 15 where the gel composition remains in the formation from about 0.25 hours to about 5 days before forming a solid, firm gel.

27. The method as recited in claim 15 where the partially and fully alkylated melamine resin comprises ethyl, propyl, isopropyl, and butylated melamine resins which can be used in reservoirs having temperatures above about 200° F.

28. The method as recited in claim 15 where alcohol and a surfactant are added to the gel-forming composition so as to obtain a homogenous gelling mixture.

29. The method as recited in claim 15 where a solid, firm gel is formed in a pH environment of less than about 6.

30. A method for selectively closing carbon dioxide break-through fingers in a subterranean formation comprising:

(a) conducting a carbon dioxide oil recovery process in said formation until carbon dioxide breakthrough occurs during which process carbon dioxide is sorbed into aqueous formation fluids in an amount sufficient to create a substantially low pH environment of about 3 to about 5;

(b) ceasing said carbon dioxide oil recovery process;

(c) introducing thereafter an effective amount of a gel-forming composition into said subterranean formation and into said carbon dioxide breakthrough fingers, said gel-forming composition being operable, when contacting carbon dioxide break-through fingers containing said fluids with a substantially low pH, to form a gel in said fingers which is operable for retarding the flow of carbon dioxide through said fingers, said gel-forming composition comprising (i) an aqueous solution containing a water soluble xanthan polymer, and (ii) a partially and a fully alkylated melamine resin sufficient to cross-link said polymer;

(d) injecting selectively said gel-forming composition into the break-through fingers of said formation where selectively is imparted by a higher viscosity resultant from said partially alkylated resin;

(e) allowing said composition to remain in the formation for a time sufficient for the fully alkylated rresin to form an active resin thereby creating a stable solid gel which closes said fingers; and (f) conducting an enhanced oil recovery method in said formation and recovering hydrocarbonaceous fluids.

31. The method as recited in claim 30 where the fully alkylated resin, is a compound having the formula:

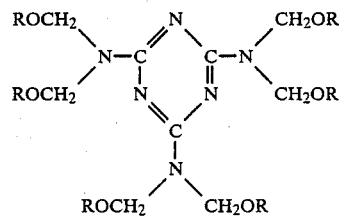

where R is selected from a member of the group consisting of $C_1$ through $C_4$ alkyl.

32. The method as recited in claim 30 where the partially alkylated resin is a compound having the formula:

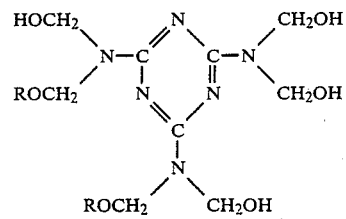

where R is selected from a member of the group consisting of $C_1$ through $C_4$ alkyl.

33. The method as recited in claim 30 where said gel-forming composition is injected into the formation via an injection or a production well.

34. The method as recited in claim 30 where said aqueous fluid comprises fresh water, salt water or brackish water.

35. The method as recited in claim 31 where R comprises ethyl, propyl, isopropyl and butyl alkyl which increase the effectiveness of said resin in reservoirs having temperatures above about 200° F.

36. The method as recited in claim 30 where after step (e) any ungelled composition is removed from the formation or diluted with water sufficient to prevent further gelation.

37. The method as recited in claim 30 where the partially and fully alkylated melamine resin comprises ethyl, propyl, isopropyl, and butylated melamine resins which can be used in reservoirs having temperatures above about 200° F.

38. The method as recited in claim 30 where alcohol and a surfactant are added to the gel-forming composition so as to obtain a homogenous gelling mixture.

39. The method as recited in claim 30 where a solid, firm gel is formed in a pH environment of less than about 6.

* * * * *

UNITED STATES PATENT AND TRADEMARK OFFICE
CERTIFICATE OF CORRECTION

PATENT NO. : 4,903,767
DATED : February 27, 1990
INVENTOR(S) : Shu et al.

It is certified that error appears in the above-identified patent and that said Letters Patent is hereby corrected as shown below:

First page, Abstract, line 7, "an" should be -- a --

Col. 1, line 62, "fuller" should be -- fully --

Col. 2, line 11, "invenrtion" should be -- invention --

Col. 5, line 34, "upon" should be -- open --

Col. 6, line 20, "cargon" should be -- carbon --

Col. 8, line 48, "resinn" should be -- resin --

Col. 9, line 34, "whhere" should be -- where --

Col. 10, line 67, "rresin" should be -- resin --

Signed and Sealed this

Twenty-eighth Day of May, 1991

*Attest:*

HARRY F. MANBECK, JR.

*Attesting Officer*  *Commissioner of Patents and Trademarks*